UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

COMPOSITION OF MATTER FOR THE GENERATION OF HEAT.

939,930.  Specification of Letters Patent.  Patented Nov. 9, 1909.

No Drawing.  Application filed May 25, 1905.  Serial No. 262,183.

*To all whom it may concern:*

Be it known that I, FRANK J. TONE, of Niagara Falls, in the county of Niagara and State of New York, have invented a new and useful Composition of Matter for the Generation of Heat, of which the following is a full, clear, and exact description.

I have discovered a new composition of matter by which very high temperatures can be produced with economy and advantage. The composition consists of a mixture of metallic silicon with an oxygen compound or compounds, preferably oxids, which I have discovered will react when ignited and will produce the desired results more efficiently than has been possible heretofore.

Silicon is capable of yielding a greater amount of heat in its oxidation than other common elements; for example in combining with oxygen to form $SiO_2$, silicon will develop 7.8 calories per gram while aluminum develops 7.2 calories in its oxidation to $Al_2O_3$, and iron only 1.2 calories in its oxidation to the form of FeO. I utilize this peculiar property of silicon for the generation of intense heat, and produce a new composition of matter for the generation of heat by mixing silicon in a finely divided state with the oxygen compound of some metal having a less affinity for oxygen than silicon; for example iron oxid, lead oxid, zinc oxid, or manganese oxid.

In practice, a mixture is made of finely divided metallic silicon and some oxid, as for instance, ferric oxid, preferably in the proportion of 84 parts of silicon and 320 parts of ferric oxid. The proportions may be varied, according to the object in view. If a complete reaction is desired, the proportions will be determined by the molecular weights and quantities in the chemical equation; but a less quantity of silicon than is necessary for a complete reaction may be used, or other substances may be introduced into the mixture. The reaction is started by raising a small portion of the mixture to the high temperature necessary for chemical combination, after which the reaction proceeds quietly throughout the mass. This high temperature at a single point may be obtained by the use of a small quantity of one of the unstable compounds, such as potassium chlorate or sodium peroxid, mixed with part of the silicon. The mixture of silicon with these unstable oxids may be ignited with an ordinary match.

The products of the reaction in the example taken for illustration are metallic iron in a state of high fluidity and intense heat, and a slag of silica or iron silicides or silicates, also highly heated. These products when pourned into a mold surrounding a joint to be welded, readily bring the parts to a welding heat, when, the proper pressure being applied, the union will take place.

In other applications of the invention, the article to be heated may be placed in the mixture of oxid and silicon in which the reaction takes place. The reaction may be performed in an ordinary fire-clay crucible or in any other receptacle capable of standing the high temperature which is developed in the furnace. The effect of the reaction is to reduce the oxid to melted metallic form and to cause the silicon to unite with the oxygen, forming silica which floats on the reduced metal as a fused slag. As the silicious slag has a lower melting point than alumina, which is the corresponding product of the so-called Goldschmidt process, it remains fluid for a longer time, and thus imparts a much wider range of utility to my invention. I am aware that silicon has been known to be a powerful reducing agent; that in the form of alloys it has been used for removing the oxygen from molten steel, being added in the same manner as the addition of manganese and other elements. It has not been known however that a mixture of silicon and oxygen compounds was capable of the self-propagating reaction which distinguishes the alumino-thermic process.

I claim:—

1. The herein described composition of matter for generating heat, which consists in a mixture of finely divided metallic silicon with an oxidizing compound of an element having less affinity for oxygen than is possessed by silicon, said composition having the property of self-propagating reaction when ignited locally by external means, substantially as described.

2. The herein described product comprising an auto-combustible mixture of powdered silicon and powdered oxygen-containing compounds of metals of less chemical stability than silicon dioxid.

3. An auto-combustible mixture consisting of silicon and one or more oxygen-containing compounds of metals of less chemical stability than silicon dioxid capable of self-propagating reaction therewith.

4. An auto-combustible mixture of one or more oxygen-containing compounds of metals of less chemical stability than silicon dioxid, and a reducing agent in which silicon is an active constituent.

In testimony whereof, I have hereunto set my hand.

FRANK J. TONE.

Witnesses:
GEORGE W. CHORMANN,
ASHMEAD G. RODGERS.